United States Patent [19]

Shiobara

[11] Patent Number: 4,930,121
[45] Date of Patent: May 29, 1990

[54] NETWORK SYSTEM USING TOKEN-PASSING BUS WITH MULTIPLE PRIORITY LEVELS

[75] Inventor: Yashuhisa Shiobara, Tokyo, Japan

[73] Assignee: Kabushiki Kaisha Toshiba, Kawasaki, Japan

[21] Appl. No.: 242,262

[22] Filed: Sep. 9, 1988

[30] Foreign Application Priority Data

Sep. 9, 1987 [JP] Japan .................................. 62-225516

[51] Int. Cl.$^5$ .................................................. H04J 3/02
[52] U.S. Cl. .................................... 370/85.4; 370/85.6; 340/825.5
[58] Field of Search .................... 370/85, 86, 94, 85.4, 370/85.6, 85.5, 85.15, 94.1; 340/825.5

[56] References Cited

U.S. PATENT DOCUMENTS

| | | | |
|---|---|---|---|
| 4,652,874 | 3/1987 | Loyer | 370/86 |
| 4,680,581 | 7/1987 | Kozlik et al. | 370/85 |
| 4,700,185 | 10/1987 | Balph et al. | 340/825.5 |
| 4,787,083 | 11/1988 | Tanaka | 370/85 |
| 4,799,052 | 1/1989 | Near et al. | 370/89 |

OTHER PUBLICATIONS

ANSI/IEEE Std. 820.4-1985 ISO Draft International Standard 8802/4, Token-Passing Bus Access Method and Physical Layer Specifications.
Control Engrg/Jun. 1987; Data Sharing on EPA or Mini MAP Subnetworks; Earl J. Whitaker, Henrik A. Schutz GE Fanuc Automation.

Primary Examiner—Douglas W. Olms
Assistant Examiner—Min Jung
Attorney, Agent, or Firm—Oblon, Spivak, McClelland, Maier & Neustadt

[57] ABSTRACT

A network system using a token-passing bus access method, comprising bus type transmission path, nodes for executing a priority processing algorithm based on a standard of an IEEE 802.4 token-passing bus, common memories respectively included in the plurality of nodes and each having a mutually common address structure, and communication circuits, respectively included in said plurality of nodes, for communicating storage contents among the common memories through the transmission path in accordance with priority levels of the priority processing algorithm.

27 Claims, 11 Drawing Sheets

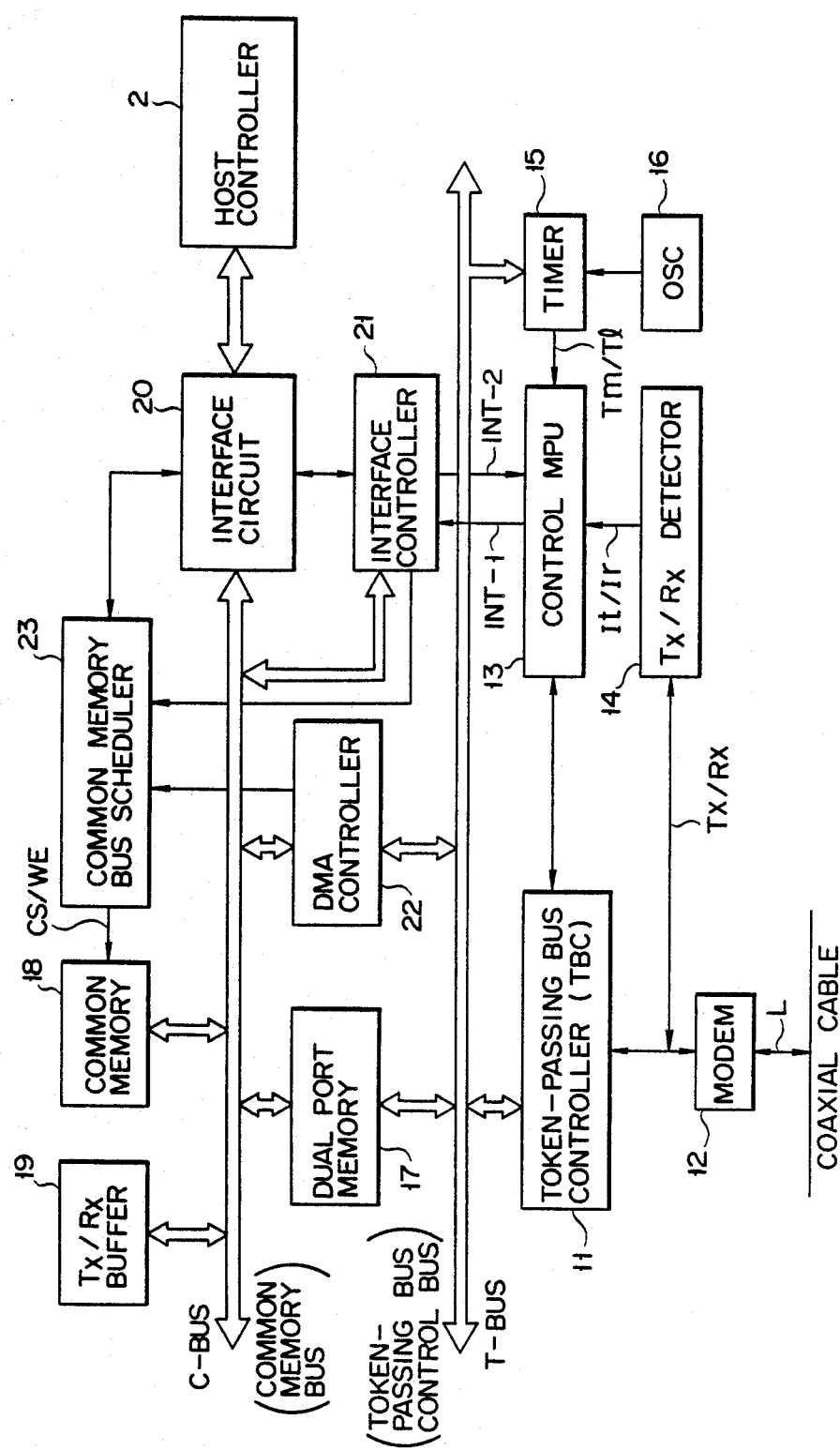
F I G. 2

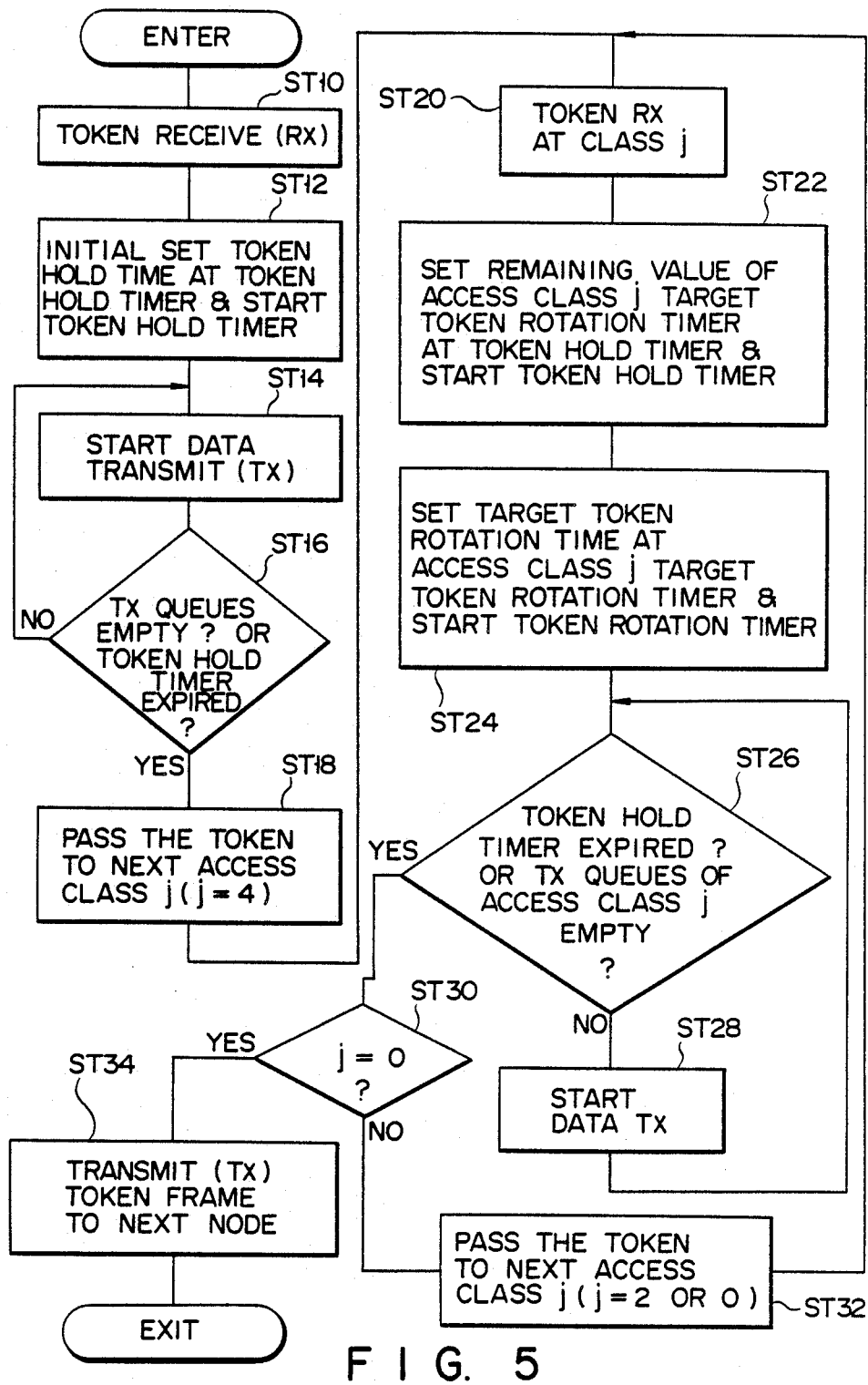
F I G. 5

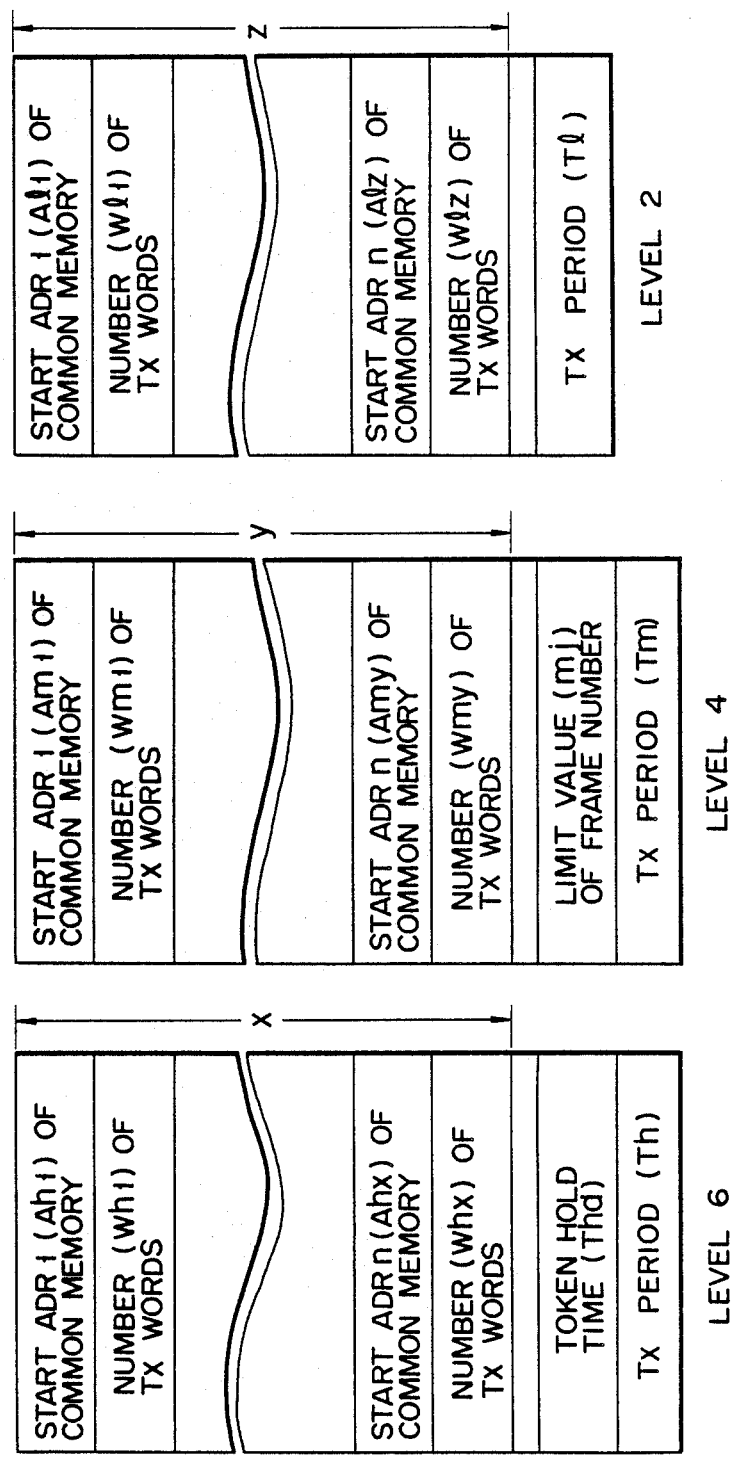

NETWORK SYSTEM USING TOKEN-PASSING BUS WITH MULTIPLE PRIORITY LEVELS

BACKGROUND OF THE INVENTION

1. Field of the Invention

The present invention relates to a network system for use in a process control system or the like, which executes data exchange between such machines coupled to a local area network (LAN) as a computer, a programmable controller (PC) and a digital instrumentation controller, and, more particularly, to a data transmission system which utilizes a token-passing bus access method, as defined by the IEEE (Institute for Electrical and Electronic Engineers) 802.4 Committee, to ensure effective transmission of data having several levels of urgency (priority) that may occur in the above-mentioned process control system or the like.

2. Description of the Related Art

Recently, rapid progress has been made with application of LAN to various fields What is receiving attention in the field of industrial LAN is MAP (Manufacturing Automation Protocol) proposed by American General Motors. The MAP is aimed to permit data exchange between different types of computers and programmable machines manufactured in different companies, and is based on the OSI (Open Systems Interconnection). The ISO (International Standardization Organization) is working on to standardize. At each level of this OSI multi-level or hierarchically-layered model, the token-passing bus, defined by the aforementioned IEEE 802.4 Committee, is used in a media access control sub-layer for data linking of lower two levels. There is another bus type LAN called CSMA/CD (Carrier Sense Multiple Access/Collision Detection) in which the individual nodes arbitrarily transmit data. According this CSMA/CD type network, when data from respective machines in the network come into collision with one another, the collision is detected and data is tried to retransmit after a transmission path becomes free. Therefore, as the quantity of machines on the network increases, the load of transmission paths increases, thus rapidly reducing the transmission efficiency.

According to a token-passing bus system, as illustrated in FIG. 12, a number of transmission devices (hereinafter called nodes) 1-1 to 1-n are coupled to a common transmission path L, and a transmission permission, called a token, is sequentially given to the individual nodes. That node, which has received the token, transmits data within a predetermined time, and a plurality of nodes do not simultaneously transmit data within the same time. Therefore, the token-passing bus type data transmission system can be said to overcome the shortcoming of the CSMA/CD type network.

The token-passing bus will be specifically described below. With the use of the taken-passing bus, the individual nodes 1-1 to 1-n are given their specific addresses in advance, and a token is sequentially shifted from the node of a large address to those of small addresses. Therefore, each node stores the address of the next node (succeeding node) to send the token to and the address of the node (preceding nodes) to receive the token from, and the token is sequentially shifted among the nodes based on these addresses. A logical ring, which has the individual nodes 1-1 to 1-n mutually coupled together, is thus constructed, as if in a ring shape. Accordingly, each node always monitors the shift flow of the token, and with the system in operation, that node, which has sent the token to another node, monitors the transmission status of the destination node and detects loss of the token to reconstruct the logical ring.

When system activating or reactivating is required due to the stant-up of the system, or due to the generation of a plurality of tokens, or failure in reception of a token, a process for contention is executed on the basis of a sorting algorithm associated with node addresses allocated to a signal-absence detecting timer and/or the individual nodes, whereby the proper logical ring is constructed. Further, with regard to intentional participation or leaving of nodes from the network, this system is provided with a function to maintain a logical ring.

According to the token-passing bus system, data to be sent by the individual nodes 1-1 to 1-n is allocated to four types of access levels in accordance with the desired transmission priority, and priority process is executed based on the token-passing bus priority algorithm defined by the IEEE 802.4. In this process, four access levels, 6, 4, 2, and 0 are provided, with 6 the highest and 4, 2, and 0 getting lower in that order. As a result, four request queues can be provided with respect to data that is on a transmission queue.

That is, upon reception of a token, a node sets a token hold time, defined by the token-passing bus, as a timer initialized value, in a token hold timer, and the transmits data with access level 6. After data transmission, the node checks whether or not a transmission queue is empty. If there is no more data to be transmitted or if the token hold time has been reached, the token is given to data with the next lower access level 4. For transmission of data with access levels 4, 2, and 0, the time required for the token to go around within the logical ring is measured so that data can be transmitted before the target token rotation time given to each access level is reached. When the token returns after the target token rotation time has elapsed, data cannot be transmitted. In this case the token is given to data with the next lower access level or to the next node.

In other words, the priority processing algorithm is provided with the token hold timer and the target token rotation timer, and with the highest priority access level, the token hold time is set, as the initial value, in the token hold timer. With a lower priority access level, however, the time remaining in the target token rotation timer is set in the token hold timer, and the target token rotation time is re-set in the target token rotation timer.

In this case, data transmission from a local node also affects the next token time. When the remaining time stored in the token hold timer is positive, data from a queue can be transmitted until the token hold time is expired or until the queue becomes empty. When time-out of the token hold timer occurs or when the queue becomes empty, a service for the next lower access begins. Upon completion of a service for the lowest access level, necessary procedures for maintaining the logical ring are executed and the token is given to the succeeding node. In this manner, the individual access levels work as virtual sub nodes within each node, and the token is given to the succeeding node after being passed around among all the access levels from the highest priority access level to the lowest one.

With a data transmission using the token passing system, a node executes data exchange with another node by transmitting command data to a node that is destined for the data exchange and then by receiving response data from the destination node. With the use of a typical MAP using a token passing bus access method, it is possible to link machines having various intelligent functions for each factory floor to ensure economical and consistent communication. For those among the machines such as a PC (Programmable Controller), a manipulator, and a CNC (Computer-implemented Numeric Controlled machining apparatus), data to be transmitted over the token-passing bus are mainly production control data and maintenance control data.

Along with progress in applying a network to factory automation (FA) for these discrete-part oriented equipment, there is demand for applying such network further to sequential process control systems having properties different from those of FA so as to provide a unified LAN. In sequential process control, however, real time operation is far more important than what is required in FA. For instance, in FA, the response time for a transmission function required for the PC or the like needs simply be about several seconds, but the response time in sequential process control needs to be in the order of several tens of msec. Further, in a distributed-control type process control system which belongs to the field of industrial application of this invention and in which a computer, PC, DCS (Distributed Control System), etc. are coupled to a network, data exchanged among these units includes data with a significantly high urgency required for every PC control cycle of several tens of msec, data required for DCS manipulation or alarm monitoring for every several hundreds of msec, instrumentation data with a lower urgency, data involved in program down loading which is processed in the background, production control data, or maintenance control data.

If a LAN that meets the conditions for coupling the aforementioned machines such as a computer, PC, and DCS can be constructed using the token-passing bus which is a potential standard for LAN, it is possible to make the best use of the inherent characteristics of a token-passing bus access method, i.e., reliability, self-recovering, and expandability, thus further increasing the number of applications of the token-passing bus access method.

When the aforementioned machines, such as a computer, PC, and DCS, are coupled to a token-passing bus, however, the following problems would be raised. There are two types of data that is exchanged between machines: data periodically generated with a cycle of a unit time corresponding to the aforementioned urgency, and data generated in response to unexpected transmission request. It is therefore necessary for each of nodes 1-1 to 1-n to periodically execute transmission control of data of each access level within a time corresponding to the urgency, and it is necessary for each machine to receive and latch the data for each cycle to update and utilize it. Further, although transmission data needs to be transmitted from higher priority data to lower one in accordance with the priority of the individual access levels, it is difficult for the current IEEE 802.4 token-passing bus access method to meet the above demands. This means that it is difficult to apply the token-passing bus access method to a process control system that contains a variety of machines mentioned above.

SUMMARY OF THE INVENTION

It is accordingly an object of this invention to provide a network system using a data transmission system, which can effectively transmit data with plural levels of urgency or unexpected data and can sufficiently apply to a process control system involving such data, while making the best use of the inherent functions of the IEEE 802.4 token-passing bus or a similar type of bus.

A network system of this invention uses a token-passing bus access-method, and comprises a bus type transmission path; a plurality of nodes for executing a priority processing algorithm based on a standard of an IEEE 802.4 token-passing bus; a plurality of common memories respectively included in the plurality of nodes and having a mutually common address structure; and a plurality of communication means, respectively included in the plurality of nodes, for communicating storage contents of the common memories between the common memories through the transmission path in accordance with priority levels of the priority processing algorithm.

BRIEF DESCRIPTION OF THE DRAWINGS

FIG. 2 is a block diagram illustrating the arrangement of each node in FIG. 1;

FIG. 5 is a flowchart for explaining a priority processing algorithm of a token-passing bus access method used in this invention;

FIGS. 7A to 7C are diagrams exemplifying data transmission control designation tables set in a common memory in FIG. 2;

DETAILED DESCRIPTION OF THE PREFERRED EMBODIMENTS

A network system according to one embodiment of this invention will be explained below with reference to the accompanying drawings. Similar or identical numerals used in these drawings specify similar or identical sections for the purpose of avoiding redundant descriptions of these sections.

Figure 1:
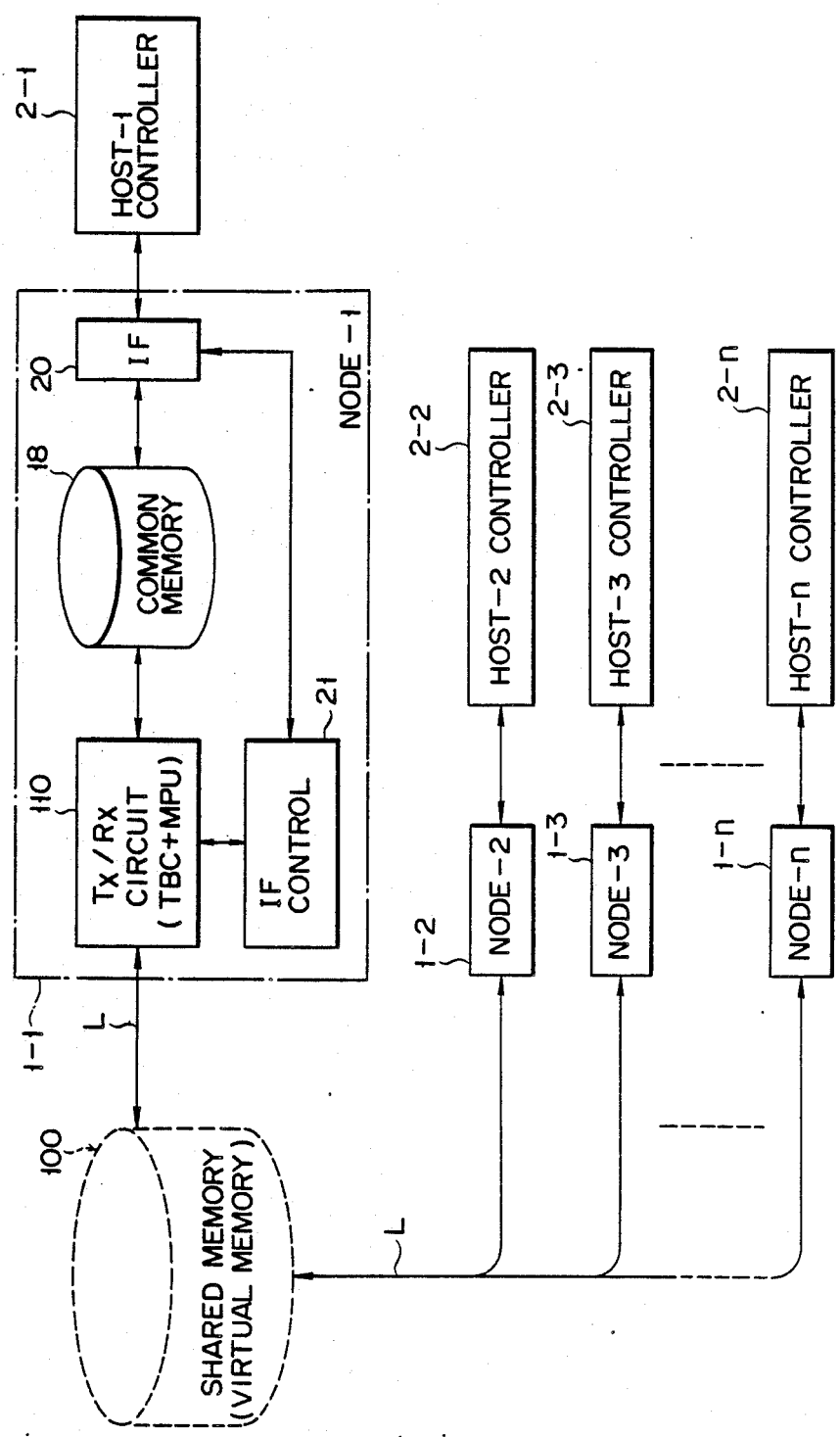
FIG. 1 is a schematic diagram of a network system according to this invention.
Figure 12:
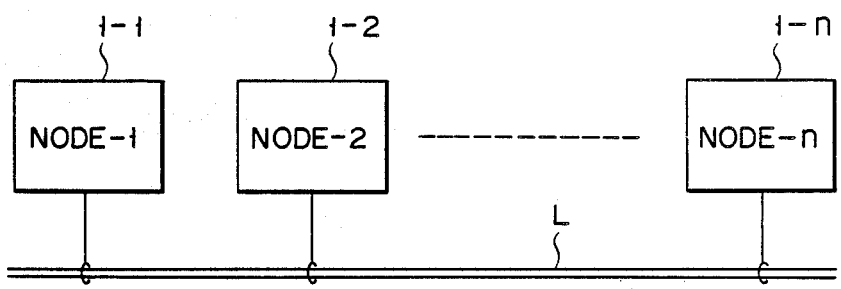
FIG. 12 is a schematic diagram illustrating the arrangement of a bus type transmission system which is generally used.

The network system according to this invention has the arrangement as shown in FIG. 1, and may apply to a bus type transmission path using a token-passing bus access method, as shown, for example, in FIG. 12.

FIG. 1 illustrates a developed type of the aforementioned MAP protocol in which a number of transmission devices or nodes 1-1 to 1-n are coupled to a network through transmission path L using coaxial cables or optical fibers. The individual nodes 1-1 to 1-n are coupled to predetermined host controllers 2-1 to 2-n, respectively.

These nodes have an identical arrangement; each node comprises interface 20, common memory 18 coupled through interface 20 to external host controller (2-1 to 2-n), transmission/reception circuit circuit 110 which executes communication with common memory 18 over transmission path L, and interface controller 21 which controls the operations of interface 20 and transmission/reception circuit 110.

Each common memory 18 stores data classified into some priority levels, and data automatically and periodically read out from common memory 18 of one node is subjected to a multi-cast communication with another node in accordance with the priority level. Thus, the higher the priority level of data to be transmitted, the more frequent communications of data are performed, so that the contents of common memories 18 of all the nodes are updated in a shorter cycle of the frequent communications involved. Upon completion of cyclic data communication of all the priority levels, all of the common memories share the same data.

A collection of a number of common memories 18 linked over transmission path L therefore functions as a large capacity virtual memory bank configured in the network through transmission path L. Such a large capacity virtual memory bank is illustrated as a shared memory 100 in the broken lines.

Referring now to FIG. 2, a description will be given of a specific example of each transmission device (node) shown in FIG. 1. In FIG. 2, 11 denotes a token-passing bus controller (TBC) for controlling the aforementioned IEEE 802.4 token-passing bus. This TBC 11 may be constituted by model MC68824, an LSI of Motorola Co., U.S.A., which has a function to execute signal processing based on a priority processing algorithm (that will be described later with reference to FIG. 5).

Incidentally, any device (LSI) other than said MC68824 can be used for TBC 11, as long as it realizes the specification of the IEEE 802.4.

TBC 11 is coupled to model 12 for effecting signal transmission to, and reception from, transmission path L. A CB type modem offered from Concord Communication Co., U.S.A., for example, can be used for this modem 12. A transmission/reception end detector 14 detects the end of reception (Rx) of a transmission frame, or the end of transmission (Tx) of a transmission frame from a local node, on transmission path L through model 12. Since the aforementioned LSI (MC68824) includes the function of detector 14, the use of this LSI eliminates the need to provide detector 14.

The transmission operation of TBC 11 is controlled by token-passing bus processor 13. Model 80186 MPU (Micro Processing Unit) of Intel Co., U.S.A., can serve as processor 13. Processor 13 acknowledges the transmission/reception timing of model 12 by signals It and Ir from transmission/reception detector 14. Further, processor 13 receives a signal of a predetermined cycle (Tm or Tl) from timer 15 with the output of oscillator 16 as an operation clock. Processor 13 sends an interrupt (INT-1) to interface controller 21 (to be described later) in accordance with the operational status of TBC 11, and accepts an interrupt (INT-2) in accordance with the operational status of interface controller 21.

Data in the transmission frame received by model 12 is sent to a dual port memory 17 for temporary storage. This data is classified into data with a plurality of access levels (priority levels), and the classified data is stored in common memory 18 which has the address structure common to the individual nodes. A transmission frame transmitted or received in response to an unexpectedly generated transmission request is sent to a transmission/reception buffer memory 19 for temporary buffer 19. The transmission of the data stored in dual port memory 17 to common memory 18 or transmission/reception buffer 19 is executed by a DMA (Direct Memory Access) controller 22.

Interface controller 21 controls the communication procedures of token-passing bus processor 13, and it may be constituted by Intel 80186 MPU or the like. This interface controller 21 controls the operation of interface circuit 20 which couples external unit (host controller) 2 to common memory 18, etc.

Common memory bus scheduler 23 has a function to control the use of a C bus (Common memory bus) at the time token-passing bus controller 11, DMA controller 22, interface circuit 20, and interface controller 21 access to common memory 18 or transmission/reception buffer memory 19. That is, scheduler 23 has a function to arbitrate a time-sharing access request for a system bus. (Intel Multi Buses I and II or Motorola VME Bus has such a function.) Token-passing bus controller 11, token-passing bus processor 13, timer 15, dual port memory 17, and DMA controller 22 are coupled to a T bus (Token-passing bus controller bus) within each node.

Figure 3:
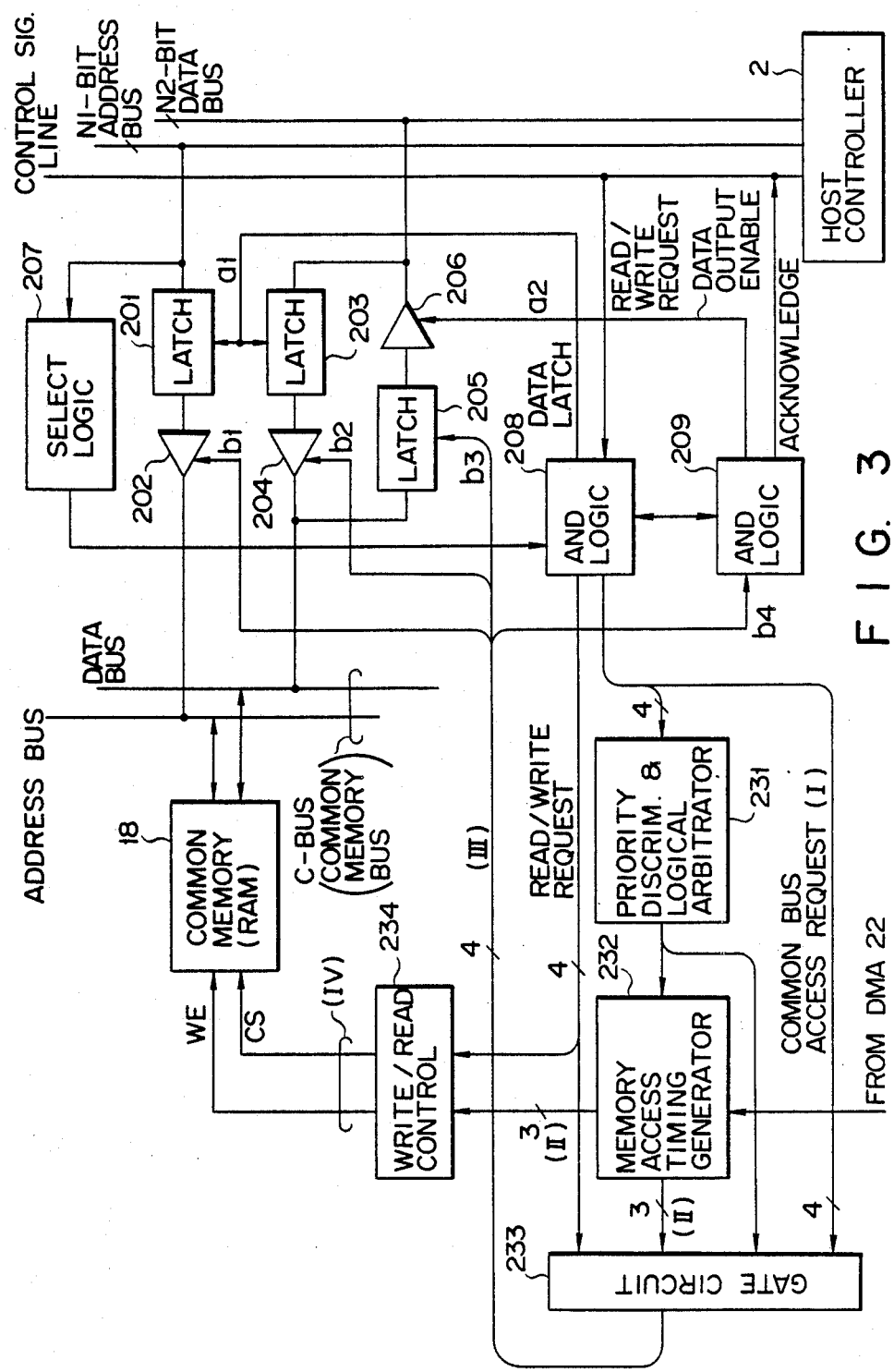
FIG. 3 is a block diagram illustrating specific arrangements of an interface circuit and a common memory bus scheduler in FIG. 2.

FIG. 3 is a block diagram illustrating a specific arrangements of interface circuit 20 and common memory bus scheduler 23. FIGS. 4A through 4M are timing charts illustrating the operation of the circuit shown in FIG. 3.

Host controller 2 and interface circuit 20 are coupled together via a control signal line, an N1-bit (e.g., 20 bits) address bus, and an N2-bit (e.g., 16 bits) data bus. Data on this address bus is latched by latch 201, and the latched data is sent on the address bus of the C bus through 3-state buffer 202.

Data on the data bus from host controller 2 is latched by latch 203, and the latched data is sent through 3-state buffer 204 onto the data bus of the C bus. The data on the C bus' data bus is latched by latch 205, and the latched data is sent through 3-state buffer 206 on the data bus of host controller 2.

Data on the address bus from host controller 2 is supplied to select logic 207 which sends a select output signal to AND logic 208 when the received data coincides with a predetermined content. Upon reception of the select output signal, logic 208 sends out latch signal a1 to latches 201 and 203.

When the control signal line from host controller 2 indicates a read request or a write request, AND logic 208 sends a signal to AND logic 209 which, in turn, returns its acknowledge to the control signal line.

Upon reception of a write request from the control signal line, AND logic 208 sends this request to gate circuit 233 and also sends common memory bus access request I (see FIGS. 4A-4D) to priority discrimination/logical arbitrator 231 as well as to gate circuit 233.

Figure 4:
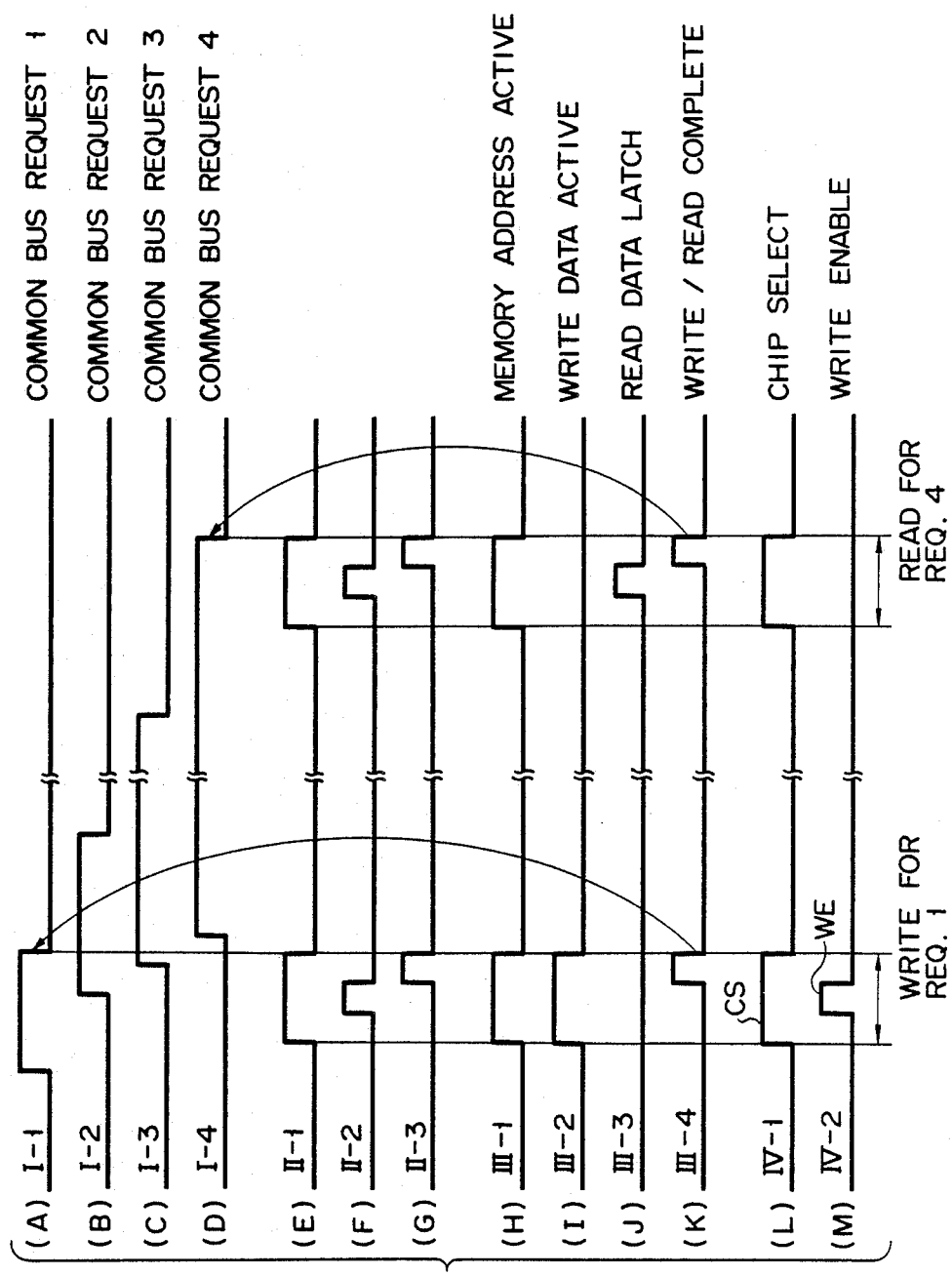
FIGS. 4A to 4M are timing charts for explaining the operation of the circuit shown in FIG. 3.

Based on these commands, the output of priority discrimination/logical arbitrator 231, and output signal II of memory access timing generator 232, gate circuit 233 outputs signal III. Signal III is formed of memory address active command b1 (FIG. 4H), write data active command b2 (FIG. 4I), read data latch command b3 (FIG. 4J), and read/write complete command b4 (FIG. 4K). These commands b1 to b4 are sent respectively to buffer 202, buffer 204, latch 205, and AND logic 209. In response to command b4, AND logic 209 sends an active command a2 to buffer 206.

Common memory bus access request I consists of requests having four levels of priority, and the command with a high priority (request 1) is outputted, by priority, from arbitrator 231. If commands with the same priority are supplied, arbitrator 231 performs a predetermined arbitration and sequentially outputs the received commands.

Upon reception of a memory access signal from DMA controller 22 in FIG. 2, memory access timing generator 232 sends signal II, as shown in FIGS. 4E–4G, to write/read controller 234. Upon reception of signal II and read/write request from AND logic 208, controller 234 sends out chip select signal CS (FIG. 4L) and write enable signal WE (FIG. 4M) to common memory 18. Upon reception of signals CS and WE, common memory 18 is subjected to a data read/write operation from/at the address indicated by the C bus at that time.

FIG. 5 is a flowchart illustrating the priority processing algorithm for the token-passing bus access method used in this invention. This algorithm is based on the IEEE 802.4 token-passing bus priority processing procedures.

The IEEE 802.4 token-passing bus priority processing algorithm has four access levels (6, 4, 2, and 0); level 6 is the highest priority and descending in the order of levels 4, 2, and 0. With the use of four types of access levels, four queues are prepared in each node for data that awaits transmission. That is, when a token is received (step ST10), the token hold time defined by the token-passing bus is sent in token hold timer 15 (step ST12) and data with access level 6 (access class j=6) is transmitted (step ST14). After data transmission, it is discriminated whether or not the associated queue is empty and whether or not the token hold time (Th) has been elapsed (step ST16). If there is not more data to be transmitted or the time count of timer 15 has reached the token hold time (Th), the token is given to the next access level 4 (j=4) (step ST18).

Timer 15 measures the time required for the token to go around the logical ring so that data with each access level 4, 2, or 0 (j=4, 2, or 0) can be transmitted before the time reaches a target token rotation time given to each access level (steps ST20–ST32). When the token returns after the target token rotation time has elapsed, data transmission is not possible until the target token rotation time of that access level is elapsed. In this case, the token is given to a lower access level or the next node (step ST34).

According to the priority processing algorithm shown in FIG. 5, the token hold timer and target token rotation timer are used. For the highest priority access level (j=6), the token hold time (Th) is set as the initial value in the token hold timer (step ST12). For a lower priority, the time remaining in the target token rotation timer is set in the token hold timer (step ST22), and the target token rotation time is reset in the token rotation timer for a service for that access level (step ST24). In this case, data transmission from a local node also affects the next token time.

When the remaining time stored in the token hold timer is positive, data from a queue can be transmitted (step ST28) until the token hold time is expired or until the queue becomes empty (No in step ST26). When time-out of the token hold timer occurs or when the queue becomes empty (Yes in step ST26), a service for the next lower access begins (step ST32). When a service for the lowest access level (j=0) is completed (Yes in step ST30), necessary procedures for maintaining the logical ring are executed and the token is given to the succeeding node (step ST34).

In this manner, the individual access levels (j=6, 4, 2, 0) work as virtual sub nodes within each node (1-1 to 1-n), and the token is given to the succeeding node after being passed around between all the access levels from the highest priority access level (j=6) to the lowest one (j=0).

Although there are four access levels (6, 4, 2, 0) provided in the foregoing description, three levels (6, 4, 2) may be used instead. Data updated between nodes 1-1 to 1-n is classified into, for example, three priority levels (6, 4, 2) and stored as such in accordance with the urgency. The classified data is allocated, as data having a specific address, in common memory 18 that has the common address throughout all the nodes 1-1 to 1-n. Further, three types of predetermined data updation cycles (Th, Tm, and Tl) common to all the nodes are set in association with the individual levels (6, 4, and 2). That is, the urgency of the above data is associated with the upper three levels, 6, 4 and 2, of the four access levels of the transmission priority processing function inherent to the token-passing bus, and data transmission is controlled with the three cycles (Th, Tm, and Tl) corresponding to the respective access levels (6, 4, and 2).

More specifically, assume that Dh, Dm, and Dl are data corresponding to the three access levels, 6, 4, and 2, and that Th, Tm, and Tl are cycles corresponding to these levels, respectively. Data of the individual levels are transmitted on the LAN in accordance with the transmission frame strings (1-1, 1-2, ...) shown in FIG. 6.

Figure 6:
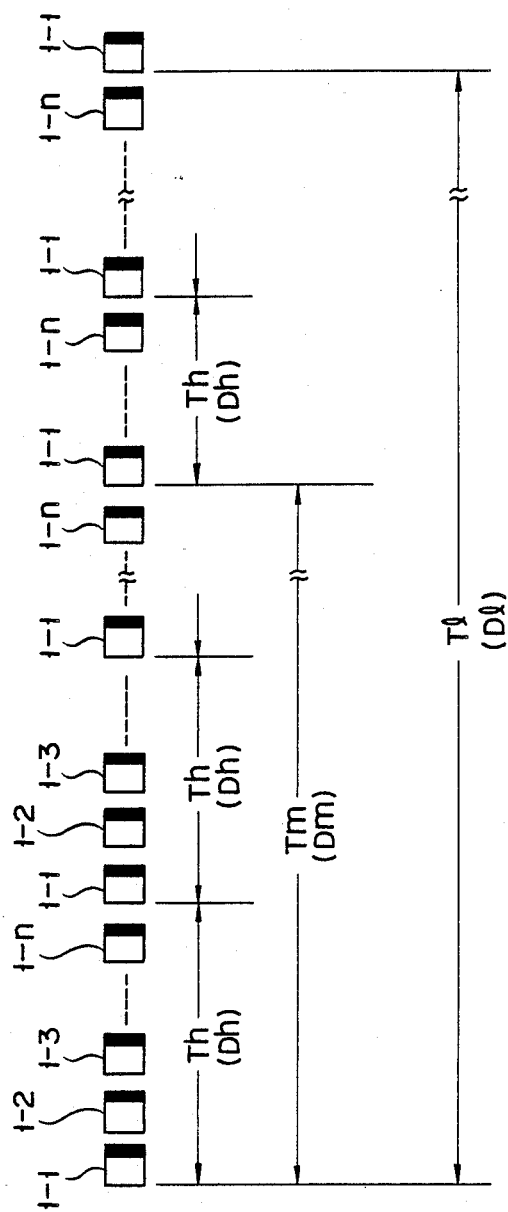
FIG. 6 is a diagram exemplifying the transmission frame of data that is transmitted from each node in FIG. 1 to a transmission path of a network.

First, data Dh is always transmitted every Th, and data Dm is transmitted by the priority within time Tm. Within time Tl, data Dm has a priority and when there is a room on the transmission path (or the path is not busy), data Dl is transmitted. In FIG. 6, white boxes indicate data frames while black sections indicate token frames.

It is assumed that the common memory is provided as hardware in every node and the structure of its memory address is common to all the nodes. A multi-cast frame from one node is simultaneously received by all the remaining nodes simultaneously, and the received data is stored in the specified common memory based on the common memory address data set in the frame, whereby data transmitted from the individual nodes or the individual machines coupled to the individual nodes are updated. Therefore, the updation is executed for every cycle set for each level. Accordingly, the individual machines can quickly read out data that is to be exchanged via the network by accessing to data at a specific address in the common memory, and all the nodes share the common data which can be easily utilized at any time.

A description will now be given of the operation of the apparatus having the arrangement as shown in FIGS. 1 and 2. First, data to be exchanged between machines, such as host controllers 2, PC, and DCS, coupled to individual nodes 1-1 to 1-n on transmission path L, is classified into different levels in accordance with the urgency. To transmit data from each node at a given time (Th, Tm, or Tl) in accordance with these levels, common memory 18 of each node is provided with the data transmission control designation tables as shown in FIGS. 7A to 7C. Each table contains a plurality of start addresses where data to be read out from common memory 18 for each level 6, 4, or 2 is stored and a plurality of the numbers of transmission words, as needed. Each start address and each number of transmission words are associated with one transmission request.

The number of transmission requests for each node is x for level 6, y for level 4, and z for level 2. Set in the tables of common memory 18 are token hold time Thd for level 6, transmission cycles Th, Tm, and Tl for the individual levels 6, 4, and 2, and transmission frame number limit mj at the start of the transmission for level 4.

Token-passing bus processor 13 reads out data such as the various times (Th, Tm, Tl, etc.) and the frame number limit (mj) from common memory 18. Then, processor 13 sets token hold time Thd in token-passing bus controller 11, and sets transmission cycles Tm and Tl in timer 15 to start the timer function. This timer 15 sends an interrupt signal to token-passing bus processor 13 every Tm and Tl.

With regard to data including unexpected data, the transmission time is determined as follows. Assume that Tdh, Tdm, and Tdl denote the times required to transmit data Dh, Dm, and Dl corresponding to the individual levels, or the times required for signals to be on the LAN as transmission frames. Assume that Tmh, Tmm, and Tml denote the times required to transmit unexpected data generated for the respective levels. Also assume that Tpd1, Tpd2, and Tpd3 respectively denote the propagation delay time depending on the number of nodes on the LAN and on the lengths of cables in use, etc., the time required for the participation or leaving sequence of nodes, and the time required to recover a failure in token passing due to noises. Then, the updation cycles Th, Tm, and Tl will have the following relation:

$$Tm = m \cdot Th \ (m: \text{an integer}) \quad (1)$$
$$Tl = l \cdot Th \quad (2)$$

$$Tl = l \cdot (Tdh + Tmh) + \{l \cdot (Tdm + Tmm)/m\} + (Tdl + Tml) + Tpd1 \quad (3)$$

$$Tm = m \cdot (Tdh + Tmh) + (Tdm + Tmm) + \{m \cdot (Tdl + Tml)/l\} + Tpd2 \quad (4)$$

$$Th = (Tdh + Tmh) + (Tdm + Tmm)/m + \{(Tdl + Tml)/l\} + Tpd3 \quad (5)$$

Data Dh, Dm, and Dl corresponding to the individual levels are transmitted from each node on the LAN. More specifically, in each node, the number of transmission words and the start address at which data to be transmitted is stored are specified, as shown in FIGS. 7A–7C, and a transmission frame corresponding to the specified number of words for each level is prepared and transmitted. Therefore, times Tdh, Tdm, and Tdl have the following relation is terms of times Tdh(n), Tdm(n) and Tdl(n) at which data is transmitted on the LAN from the individual nodes and transmission times Tw(wh.k), Tw(wm.k) and Tw(wl.k) defined by the number of transmission words:

$$Tdh = \overset{n}{\Sigma} Tdh(n) \quad (6)$$

$$Tdm = \overset{n}{\Sigma} Tdm(n) \quad (7)$$

$$Tdl = \overset{n}{\Sigma} Tdl(n) \quad (8)$$

Therefore, $$Tdh = \overset{k}{\Sigma} Tw(wh \cdot k) \quad (9)$$

$$Tdm = \overset{k}{\Sigma} Tw(wm \cdot k) \quad (10)$$

$$Tdl = \overset{k}{\Sigma} Tw(wl \cdot k) \quad (11)$$

Given that Wdh, Wdm, and Wdl are the numbers of transmission words for data Dh, Dm, and Dl, the following relation is established:

$$Wdh = \overset{n}{\Sigma} \overset{k}{\Sigma} Wh \cdot k \quad (12)$$

$$Wdm = \overset{n}{\Sigma} \overset{k}{\Sigma} Wm \cdot k \quad (12)$$

$$Wdl = \overset{n}{\Sigma} \overset{k}{\Sigma} Wl \cdot k \quad (14)$$

Various parameters defined by the transmission priority processing function inherent to the token-passing bus IEEE 802.4 are set for each level as follows:

Token hold time $Th = Tdh(n) + Tmh(n)$ (15)

(16)

Target token rotation time for level 4
$Ttr4 = Th + Tl*$ (17)

Target token rotation time for level 2
$Ttr2 = Th$ (18)

Target token rotation time for level 0
$Ttr0 = Th$

Therefore, Tmh(n) in equation (15) represents the time for a transmission request which is unexpectedly generated and which permits data transmission for level 6. Actually, this time is determined by the amount of transmission data and the number of frames. Tl* is the timer determined by the amount of transmission data for level 4 which is transmitted under normal state.

According to this invention, the aforementioned time parameters, etc. are set and used for transmission control. More specifically, based on token hold time Tdh and transmission time Th read out from common memory 18, token-passing bus processor 13 sets, in token-passing bus controller 11, Tdh as the token hold time, $Ttr4=Th+T1^*$ as the target token rotation time for level 4, $Ttr2=Th$ as the target token rotation time for level 2, and $Ttr0=Th$ as the target token rotation time for level 0. Here, $T1^*$ is the time calculated from frame number limit mj.

First, in a startup state where the transmission state becomes the normal (stable) state, in response to a data transmission request of level 6, token-passing bus processor 13 adds a data request to the queues of all token-passing bus controllers 11. In response to a data transmission request of level 4, a data request for the amount corresponding to frame number limit mj is added to the queue of token-passing bus controller 11. Transmission requests of levels 2 and 0 are inhibited.

When the transmission rotation for each node is completed, or after time Th has elapsed, all the data transmission requests of level 4 are added to the queue of token-passing bus controller 11. All the data transmission requests of levels 2 and 0 are added to the queue of token-passing bus controller 11.

Figure 8A:
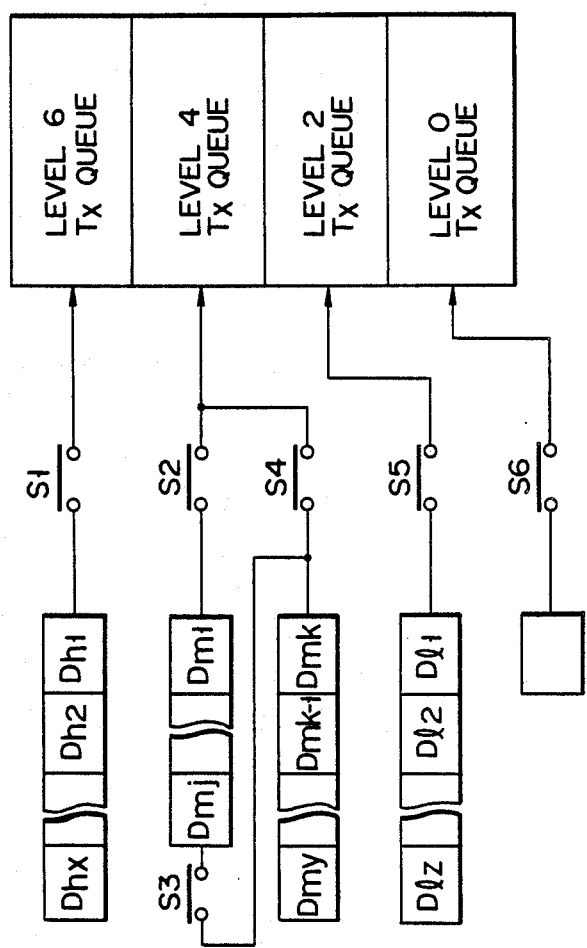
FIGS. 8A and 8B diagrams for explaining the relationship between a transmission request and a transmission queue which are used in the arrangement shown in FIG. 2.
Figure 8B:
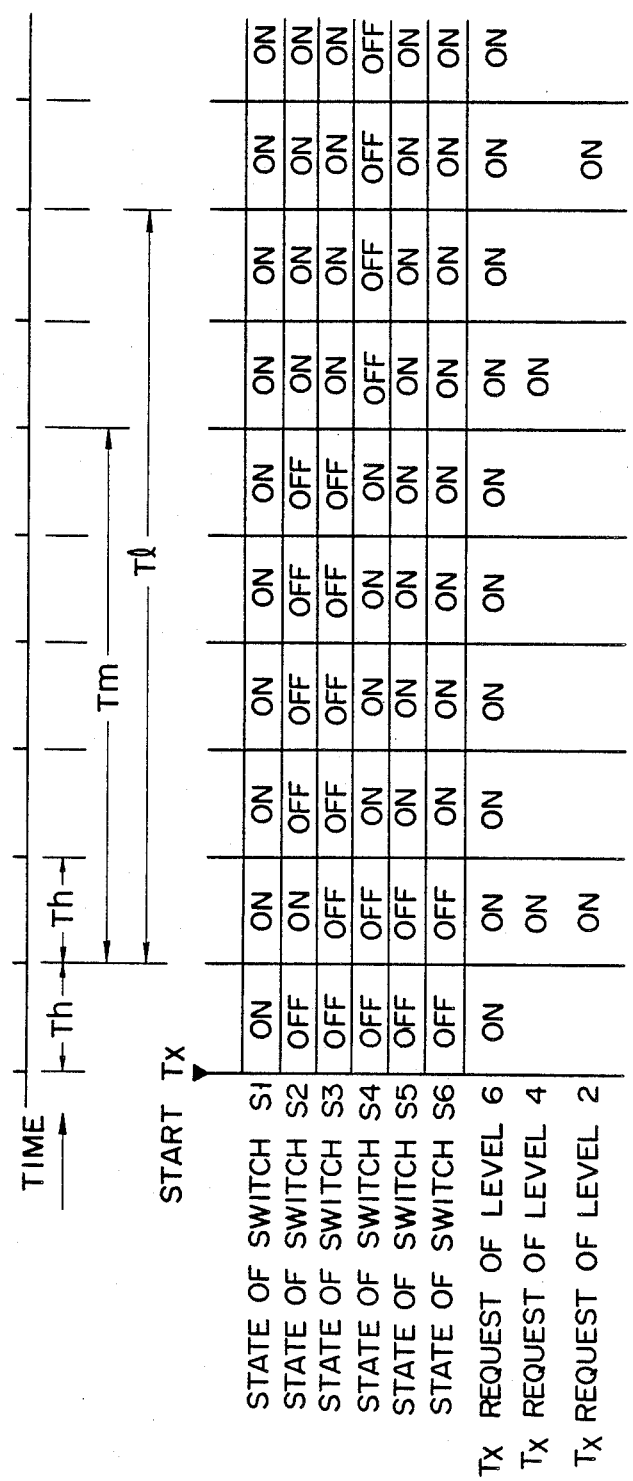

FIGS. 8A and 8B exemplify the queues controlled by token-passing bus processor 13. FIG. 8A illustrates an example of transmission requests and queues of the individual levels at the time of transmission startup, and the control of transmission queues is controlled by processor 13 by some software according to what is shown in FIG. 8B. Upon reception of timer time expire detection signal Tm from timer 15, token-passing bus processor 13 adds all the data transmission requests of Dm and Dl again to the transmission queues of levels 4 and 2. All of data transmission requests of level 6 should be added to the transmission queues within time Th. In other words, when transmission end detector 14 detects the end of data transmission of level 6, a transmission request is again added to the queue.

In the above manner, data of level 6 of each node is always transmitted every Th. Within time Tm, data of level 4 is given a priority for transmission and is transmitted, and data of level 2 is transmitted in accordance with the transmission allowance within time Tl.

Figures 9, 10:
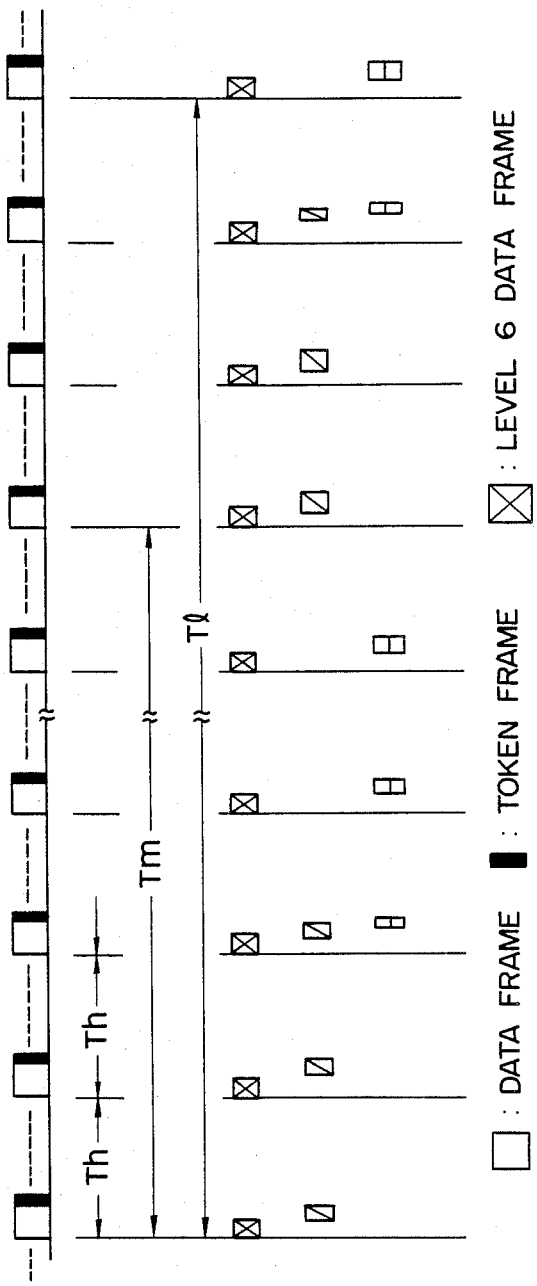
FIG. 9 is a diagram illustrating a transmission example for explaining how data with each priority level is sent from each node on the transmission path.
FIG. 10 is a diagram illustrating the format of a data frame of each priority level which is transferred from each node in FIG. 1 to the transmission path.

FIG. 6 exemplifies the data frame that is transmitted from each node on the transmission path, and FIG. 9 illustrates an example as to how data of the individual levels are transmitted from one node. An example of the format of the data frame on the transmission path in the latter case is illustrated in FIG. 10.

In FIG. 10, PRE is a pre-anble pattern, SD is a start delimiter, FC is a frame control, DA is a destination node address, SA is a sender node address, DSAP is a destination service access point, SSAP is a sender service access point, C is command, LEN is a the length of data, FCS is a frame check sequence, and ED is an end delimiter. FC includes a code for identifying the level of a data frame transmitted.

DSAP, SSAP, and C specify that the data transmission frame is according to the present system LEN and ADR coincide with the set data shown in FIGS. 7A-7C.

When modem 12 receives a data frame on transmission path L, data received by modem 12 is sent through token-passing bus controller 11 to dual port memory 17 and is stored therein. Then, when detecting the end of reception of a transmission frame, transmission/reception end detector 14 outputs reception end detection signal Ir. Upon reception of signal Ir, token-passing bus processor 13 determines whether or not the data frame is associated with the present system. If the decision is affirmative, processor 13 reads out the common memory address in the frame that should be stored and causes DMA controller 22 to send the received data from dual port memory 17 to common memory 18. In this manner, the received data is stored in common memory 18 of each node at the specified cycle, so that the content of common memory 18 is always updated to the newest.

According to the arrangement of the above embodiment, therefore, since common memory 18 is provided in each node and received data is stored in the common memory at a specified cycle, machines coupled to each node can read out and use the newest data updated on common memory 18 irrespective of the transmission operation. In addition, writing data simply in common memory 18 can ensure data exchange between nodes without considering the transmission operation. Further, with the provision of dual port memory 17, a received data frame can be temporarily stored in the memory. After checking the content of the frame, the content of dual port memory 17 is stored at a specified address in common memory 18 which is where the newest data should be stored. With regard to data storage in common memory 18, data is read out and sent to DMA controller 22 on the side of the C bus, while received data is stored and its content is checked on the side of the T bus, so that the transmission capabilities of the T and C buses can be effectively used.

With the data transfer rate of 10 Mdps, data should be transmitted every 16 bits, which corresponds to the time of 1.6 μsec. The reception operation is continuously executed based on a specific algorithm using token-passing bus controller 11, and those procedures, processes, etc., which require relatively a long period of time and are complicated, are executed using interface controller 21, thus distributing the load of the transmission processing and realizing a compact and low-cost system.

Figure 11:
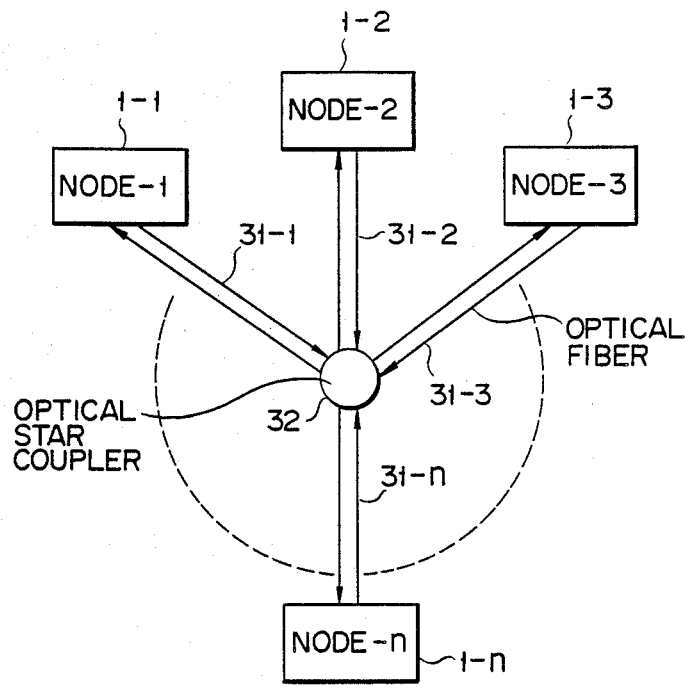
FIG. 11 is a diagram illustrating a modification of the network system shown in FIG. 1.

Although a coaxial cable as shown in FIG. 12 is used for common transmission path L in the above embodiment, an optical fiber cable 31 and an optical star coupler 32 as shown in FIG. 11 may be used for transmission path L. Optical fiber cable 31 includes two-core optical fibers, and a transmission signal from each node reaches optical star coupler 32 through optical fiber cable 31, where it is split and is sent to each node. The topology shown in FIG. 11 is physically of a star type, but can be logically treated as a bus type.

In the above embodiment, the timing for re-setting a transmission request of each node to its associated queue is done after detecting the end of data transmission from a local node; however, since all the nodes always receive data, such re-setting of the transmission request can be executed at the time data reception by the node next to the local node is detected. According to the embodiment, the transmission frame is constructed in such a way that a multi-cast address is set as the destination node address DA in each node; however, even if a node which does not use the present system can be mixed with the present apparatus as shown in FIG. 2 on transmission paths, data transmission can be executed without problems. Although all the received data frames are stored in common memory 18, not all the nodes need the received data. In such a case, at the time the frame is stored in dual port memory 17, the common memory address included in the frame is discriminated and if is found that some nodes do not need it, transferring the frame to common memories 18 of these nodes is then inhibited. This can minimizes the capacity of common memory 18 and can reduce the necessary hardware, thus realizing low-cost nodes. Further, although data is classified into three levels in the above embodiment, the data may be classified into a different number of levels of urgency in association with the levels of IEEE 802.4.

The contents of this invention are disclosed in the following article issued by Yasuhisa SHIOBARA (present inventor) et al. For the purpose of supporting the disclosure of this invention, part of this article will be quoted below.

(1) "Advanced MAP for real-time process control"
Yasuhisa SHIOBARA, Takayuki Matsudaira, Yoshio Sashida, Makoto Chikuma
Heavy Apparatus Engineering Laboratory,
Toshiba Corporation
1, Toshiba-cho, Fuchu-shi, Tokyo, 183 Japan 1987

(2) "Enterprise Conference Proceedings" "ADMAP for Real-time Process Control" Yasuhisa SHIOBARA et al.
Society of Manufacturing Engineers Dearborn,
Michigan June 5-9, 1988

A network system of this invention uses a token-passing bus access method, and applied to bus type transmission path L. Connected to transmission path L are many nodes each for executing a priority processing algorism based on a standard of an IEEE 802.4 taken-passing bus access method. All of these nodes respectively include common memories 18 each having a mutually common address structure. The storage contents (Dh, Dm, Dl) of common memories 18 are communicated via transmission path L, in accordance with given priority levels (6,4,2) of the priority processing algorism.

In a network system having the above configuration, each common memory 18 stores data which are classified into several priority levels. The data, automatically and periodically read out from common memory 18 in one node, are communicated with other nodes, using, for example, a multi-cast communication. Then, the storage contents of common memories 18 in all nodes are renewed such that the higher the priority level provides the more the number of frequency of the data communication within a short period of time, to thereby periodically complete the data communication of all priority levels. All common memories 18 can thus be share the same data.

As mentioned above, a combination of many common memories 18 coupled to transmission path L functions as if it were a large-capacity virtual memory bank configured on the network of transmission path L. On the other hand, host equipment connected to each common memory 18 can quickly access to this common memory. More specifically, for the host equipment, common memory 18 may be regarded as a high-speed cache memory with respect to the above-mentioned virtual memory bank. Thus, by use of a network system of this invention, each host equipment can substantially obtain a high-speed, large-capacity memory (100 in FIG. 1).

According to this invention, data that is exchanged between machines, such as computers, PCs, and DCSs interconnected through a LAN for a process control system classified into two: the one always generated at a cycle according to the urgency and the other generated in response to an unexpected transmission request. In addition, the unexpected data is allocated to the highest priority level for transmission so that it can surely be transmitted. Further, each node can periodically control the transmission of data within a time determined in accordance with the level of urgency. As the individual machines receive the data and latch it for updation every cycle, they can always make the use of the newest data. Furthermore, all the nodes can simultaneously receive a multi-cast communication frame from each node and can store the received data in a common memory that is specified by the common memory address data set in the frame, whereby the contents of data sent from the individual machines can be easily updated in the common memory. This updation is executed every cycle set for each level. Therefore, those machines coupled to each node can immediately read out data that should be exchanged on the LAN by accessing to data stored at a specified address in the common memory, and all the nodes can share the common data, so that data can be easily utilized at any time.

Accordingly, the present apparatus can apply to process control systems at a low cost and without making the apparatus large while making the best use of the inherent function of the IEEE 802.4 token-passing bus access method.

What is claimed is:

1. A network system using a token passing bus access-method, comprising:
    a bus type transmission path;
    a plurality of nodes, coupled to said transmission path, for executing a priority processing algorithm based on a standard of an IEEE 802.4 token-passing bus or a standard of a bus functionally substantially equivalent to said token-passing bus;
    a plurality of common memories respectively included in said plurality of nodes and each of said common memories having a mutually common address structure, said common memories being connected together to function as a shared virtual memory; and
    a plurality of communication means, respectively included in said plurality of nodes, for communicating storage contents of said common memories of said plurality of nodes between said common memories through said transmission path in accordance with priority levels of said priority processing algorithm.

2. The network system according to claim 1, wherein each of said plurality of communication means includes:
    means for repeating a communication of said storage contents executed between said common memories through said transmission path at a shorter cycle for a higher one of said priority levels.

3. The network system according to claim 1, further comprising:
    a plurality of controllers respectively coupled to said plurality of nodes and having predetermined processing functions; and
    a plurality of interface means respectively included in said plurality of nodes, for exchanging said storage contents of said common memories with said controllers.

4. The network system according to claim 3, wherein each of said plurality of nodes includes:
    a common memory bus for transferring said storage contents of said common memories between said common memories and said interface means; and
    arbitration means, coupled to said common memories and said interface means, for arbitrating an access request of said common memory bus when said interface means accesses to said common memories.

5. The network system according to claim 4, wherein each of said plurality of nodes includes:
a control bus for said token-passing bus, coupled to said communication means; and
exchanging means, coupled to said control bus and said common memory bus, for exchanging data (transmission frame) and said storage contents of said common memories which are received over said transmission path by said communication means, between said control bus and said common memories.

6. The network system according to claim 5, wherein each of said plurality of nodes includes:
a buffer memory, coupled to said common memory bus, for temporarily storing said data outputted from said exchanging means and said storage contents outputted from said common memories.

7. The network system according to claim 6, wherein each of said plurality of nodes includes:
a DMA controller, coupled to said control bus and said common memory bus, for controlling data exchange between said buffer memory, said exchanging means and said common memories.

8. The network system according to claim 1, wherein each of said plurality of communication means includes:
setting means for setting a predetermined first transmission cycle for a highest one of said priority levels, setting a predetermined second transmission cycle longer than said first transmission cycle for a middle one of said priority levels, and setting a predetermined third transmission cycle longer than said second transmission cycle for a lowest one of said priority levels; and
transferring means, coupled to said setting means, for transferring said storage contents of said common memories on said transmission path according to said first, second or third transmission cycles corresponding to said priority levels.

9. The network system according to claim 8, wherein said transferring means includes:
a modem, coupled to said transmission path, for exchanging a transmission frame including data of said storage contents of said common memories with another one of said nodes; and
a token-passing bus controller, coupled to said modem, said setting means and said common memories, for executing said priority processing algorithm with said first, second, and third transmission cycles being associated with said priority levels.

10. The network system according to claim 1, wherein each of said common memories has storage regions whose number corresponds to said priority levels, and queues of data awaiting for transmission which correspond to said priority levels are formed in said storage regions.

11. The network system according to claim 1, wherein said bus type transmission path has a coaxial cable for data communication.

12. The network system according to claim 1, wherein said bus type transmission path has an optical cable for data communication.

13. The network system according to claim 1, wherein said network system is a system using a computer inter-communication protocol OSI (Open Systems Interconnection) conforming to a standard of the ISO (International Standardization Organization).

14. A network system using token-passing bus access method, in which a plurality of transmission devices are coupled to a bus type transmission path, and each of said transmission devices is connected to given control instruments, each of said transmission devices comprising:
a media-access controller having a priority processing function to be based on a specification of a token-passing bus access method according to the IEEE 802.4 standard;
a modem, coupled to said media-access controller, for transmitting and receiving data of transmission frames between said transmission path and said media-access controller;
a transmission/reception-completion detector, coupled to said modem, for detecting a transmission-completion and reception-completion of the transmission frame between said modem and said transmission path;
a transmission processor, coupled to said media-access controller, for governing a data transmission performed by means of said media-access controller and said modem;
a timer for informing said transmission processor of a timing which determines a data transmission period of said modem;
a first memory, coupled to said media-access controller, for temporarily storing data of a reception transmission frame delivered from said modem;
a second memory, coupled to said first memory and being provided with a given address configuration which is common to all of said transmission devices, for storing data in accordance with address information contained in the transmission frame being transmitted or received; and
a DMA controller for sending the transmission frame data stored in said first memory to said second memory;
wherein the data exchanged between said transmission devices and said control instruments are classified into three or more data Dh, Dm, and Dl according to given levels regarding an urgency of the data, these data Dh, Dm, and Dl being assigned to predetermined address areas in said second memory which are common to all of said transmission devices; and
said timer determines data refreshing periods Th, Tm and Tl which are common to all of said transmission devices, so that these data refreshing periods Th, Tm and Tl correspond to respective access levels of the priority processing function of said token-passing bus access method.

15. A network system according to claim 14, wherein the data Dh is always sent from said transmission devices to said transmission path for each said data refreshing period Th, the data Dm is primarily sent from said transmission devices to said transmission path within said data refreshing period Tm, and the data Dl is sent from said transmission devices to said transmission path within said data refreshing period Tl if said transmission path is not in a busy status.

16. A network system according to claim 15, wherein each of said transmission devices is provided with its own given token hold time, and sum of all token hold times of the said transmission devices is selected to be less than said data refreshing period Th.

17. A network system according to claim 16, wherein a sum of said data refreshing period Th and time T1* corresponding to a predetermined transmission frame limit value is used for a target token rotation time of the access level of said data Dm.

18. A network system according to claim 17, wherein said data refreshing period Th is used for a target token rotation time of the access level of said data Dl.

19. A network system according to claim 14, wherein said transmission processor adds, to a queue of said media-access controller, all of data transmission requests for the access level of said data Dh, until a data transmission state of said transmission devices becomes substantially stable.

20. A network system according to claim 19, wherein said transmission processor adds, to a queue of the media-access controller, data transmission requests for the access level of said data Dm by a number of a predetermined transmission frame limit value, until a data transmission state of said transmission devices becomes substantially stable.

21. A network system according to claim 20, wherein said transmission processor inhibits data transmission requests for the access level of data D1, until a data transmission state of said transmission devices becomes substantially stable.

22. A network system according to claim 21, wherein data transmission requests of the access level of said data Dm, generated after elapsing said data refreshing period Th, are all added to a queue of this access level.

23. A network system according to claim 22, wherein data transmission requests for the access level of said data Dl, generated after elapsing said data refreshing period Th, are all added to a queue of this access level.

24. A network system according to claim 14, wherein, within said data refreshing period Th, a data transmission request for said data Dh is always added to a transmission waiting queue of the access level of said data Dh.

25. A network system according to claim 24, wherein, when said data refreshing periods Tm and Tl are expired, said timer sends a period expiring detection signal to said transmission processor, and, in response to this period expiring detection signal, said transmission processor adds data transmission requests for said data Dm and Dl to transmission waiting queues of the access levels of these data Dm and Dl.

26. A data transmission system having process control machines coupled through a plurality of transmission devices to a bus type transmission path, for exchanging data between said process control machines, characterized in that:
said transmission devices are each provided with a token-passing bus controller, which has a function for executing a priority processing algorithm as defined by an IEEE 802.4 token-passing bus or an identical processing function, and a common memory, which stores data classified into a plurality of access levels and has an address structure common to the individual transmission devices, said common memories being connected together to function as a shared virtual memory;
a transmission frame transmitted through said transmission device of each control machine is received by said transmission device of another control device, and frame data is stored and updated in said common memory based on common memory address data included in said transmission frame; and
transmission of data is controlled at time cycles set for the respective access levels of said common memory in association with access levels of said priority processing algorithm of said token-passing bus.

27. A data transmission system having a plurality of process control machines, each coupled through a plurality of transmission devices to a bus type transmission path, for exchanging data between said process control machines, characterized in that:
said plurality of transmission devices are each provided with a token-passing bus controller, which has a function for executing a priority processing algorithm as defined by an IEEE 802.4 token-passing bus or an identical processing function, a common memory, which stores data classified into a plurality of access levels and has an address structure common to the individual transmission devices, a transmission/reception detector for detecting an end of reception of a transmission frame on said transmission path or an end of transmission from a local node through a modem coupled to said token-passing bus controller, a processor, provided between said detector and said token-passing bus controller, for executing data transmission control, and a timer circuit for supplying a timing of data transmission cycles to said processor;
in a startup state where a transmission state of each of said transmission devices becomes a normal state, said processor puts all of transmission requests for data with an access level having a high urgency in a queue for said token-passing bus controller;
transmission requests for data with a next access level which correspond to a number of frame-number limiting values are added to a queue for that level; and
a transmission request for data with a lower access level is inhibited, and after one transmission circulation of each transmission device, transmission requests for data with the next access level and said lower access level are added to queues for respective access levels, and upon reception of a signal indicating elapse of a predetermined time from said timer circuit, said processor adds transmission requests for data with the individual access levels to queues for respective access levels.

* * * * *